July 8, 1952 T. J. FINNERAN ET AL 2,602,668

AUTOMATIC PHONOGRAPH RESETTING APPARATUS

Filed May 3, 1946 2 SHEETS—SHEET 1

THOMAS J. FINNERAN,
CHARLES O. SLYFIELD,
INVENTORS.

BY

ATTORNEY.

July 8, 1952 T. J. FINNERAN ET AL 2,602,668

AUTOMATIC PHONOGRAPH RESETTING APPARATUS

Filed May 3, 1946 2 SHEETS—SHEET 2

THOMAS J. FINNERAN,
CHARLES O. SLYFIELD,
INVENTORS.

BY [signature]

ATTORNEY.

Patented July 8, 1952 2,602,668

UNITED STATES PATENT OFFICE 2,602,668

AUTOMATIC PHONOGRAPH RESETTING APPARATUS

Thomas J. Finneran and Charles O. Slyfield, Los Angeles, Calif., assignors to Walt Disney Productions, Burbank, Calif., a corporation of California Application May 3, 1946, Serial No. 667,090

4 Claims. (Cl. 274—15)

This invention relates generally to a positioning apparatus for positioning any movable member in a preselected manner, and more particularly to an apparatus for automatically positioning and resetting in a preselected manner the tone arm of a phonograph. The device may be used to automatically repeat any selected section of a recording.

It is the current practice in motion picture studios when making a foreign language version of a talking motion picture, which originally was recorded in the English language or in any given language, by the process known as dubbing in translated dialogue, to play very short portions of the recorded dialogue in the presence of a translator and actor, who then tries to record translated dialogue in exactly the same time interval as the short portion of the original dialogue played. It is quite difficult to time the translated dialogue so as to exactly coincide with the short excerpt of the original dialogue, and the translator may have to replay the portion of the original dialogue many times while attempting to record a translated dialogue coincidentally therewith. Since each such step constitutes only a very small portion of the total dialogue in a talking picture, it can be seen that the process of making a foreign language version of a talking motion picture by means of the beforementioned dubbing in process is quite lengthy, tedious, and time-consuming.

Each time the translator and/or actor repeats a given portion of the original dialogue, the tone arm, pickup means, or the like is returned to the point on the recorded medium corresponding to the beginning of the portion of the original recorded dialogue to be played. If the original dialogue is recorded on a sound track on film wound on reels, or made up into film loops, it can readily be seen that the reel of film must be rewound or run into the initial point. This makes this process impractical. Generally, the sound track is transferred from the motion picture film to a disc recording so that the tone arm may be returned to the initial position corresponding to the beginning of the portion of the dialogue to be translated by simply lifting the tone arm and moving it to the proper groove on the record. This process is simpler than the previously mentioned system using sound track recorded on film wound on reels or made up in the form of continuous film loops.

However, this system has the disadvantage that it is very difficult to locate the desired initial point on the record, and when manually reset, the tone arm may be a number of grooves removed from the desired starting point. Since this procedure is inefficient and consumes much time, it is therefore desirable to have an apparatus which will automatically return the tone arm of a phonograph to a precisely preselected point on a disc recording mounted on the phonograph turntable.

Means for automatically resetting a pickup or tone arm to any desired point in a record are also of great advantage to students of foreign languages, since recorded foreign language lessons, including vocabularies, pronunciation drills, grammar, and the like, can be used and any selected portion of said recording may be repeatedly reproduced as often as desired. This might very advantageously be used, for example, in foreign language pronunciation drills recorded on discs.

A system of the character described, or modifications thereof, might also be very advantageously used for radio spot announcements, electrical transcriptions, recordings, and the like, since split-second timing is very important in the radio station.

With the above points in mind, it is an object of the present invention to provide an apparatus for automatically positioning and resetting in a preselected manner the tone arm of a phonograph.

It is a further object of this invention to provide an apparatus adapted to automatically repeat any preselected section of a disc recording.

It is a further object of this invention to provide an apparatus for resetting the pickup arm of a transducer into any preselected starting point on a record.

Another object is to disclose and provide relatively simple and accurate means whereby the pickup arm may be returned to any preselected starting position on a record.

The apparatus of this invention and many uses and adaptations thereof will be readily understood from the description of certain exemplary forms shown in the appended drawings, wherein.

Generally speaking, the device of this invention may be employed with a phonograph having a rotatable turntable adapted to carry a disc record thereon and having a pivotally mounted tone arm provided with a reproducing needle or pickup in one end thereof. As is customary, the tone arm is pivoted to move in a plane parallel to the record and also in a plane transverse thereto so as to permit the needle to be lifted out of engagement with the disc.

The device of the present invention includes a stationary guide provided with an adjustably positionable stop carriage thereon, the stop carriage being provided with a translating arm pivotally attached to the carriage so that the arm may extend in a plane parallel to the record disc or at an angle thereto. The tail piece or end of the tone arm opposed to the pickup end is preferably provided with antifriction means capable of cooperating with the translating arm, such antifriction means being also adapted to abut and to be stopped by the carriage. Manual or automatic means for moving the translating arm are provided for the purpose of pivoting the tone arm upon its mounting so as to lift the needle or pickup out of cooperating engagement with the disc whereupon the tone arm pivotally moves in a substantially horizontal plane until the antifriction means abuts the stop carriage, thereby positioning the pickup needle at a point above the record determined by the position of the stop carriage. The needle may then be placed upon the record by pivotal movement of the translating arm, which movement may be imparted either manually or automatically.

Figures 1, 2, 4, 5:
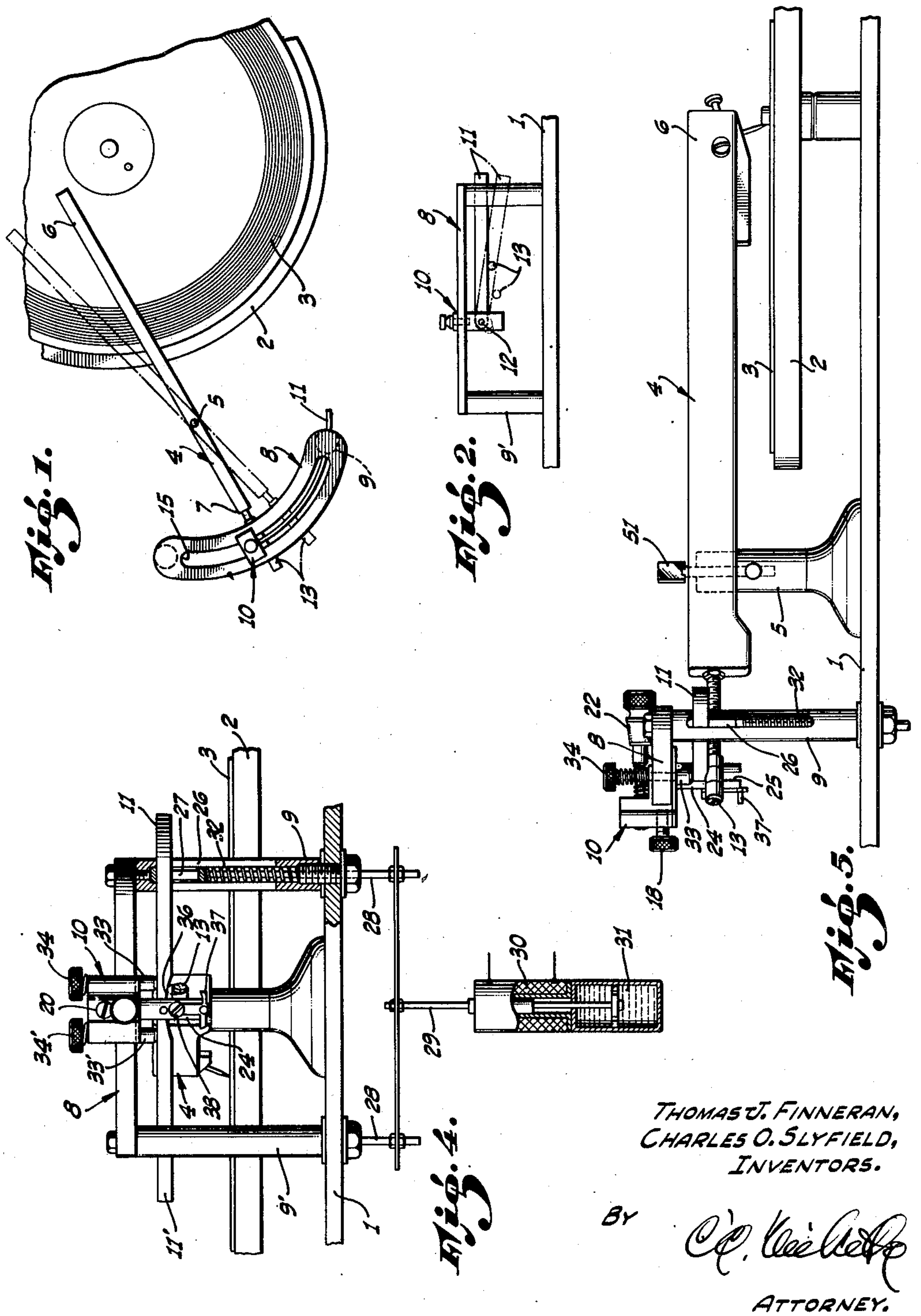
Fig. 1 is a schematic plan view of a simple embodiment of the invention.
Fig. 2 is an end view of the simplified embodiment illustrated in Fig. 1.
Fig. 4 is an end elevation of the apparatus.
Fig. 5 is a side view thereof.
Figures 3, 6, 7:
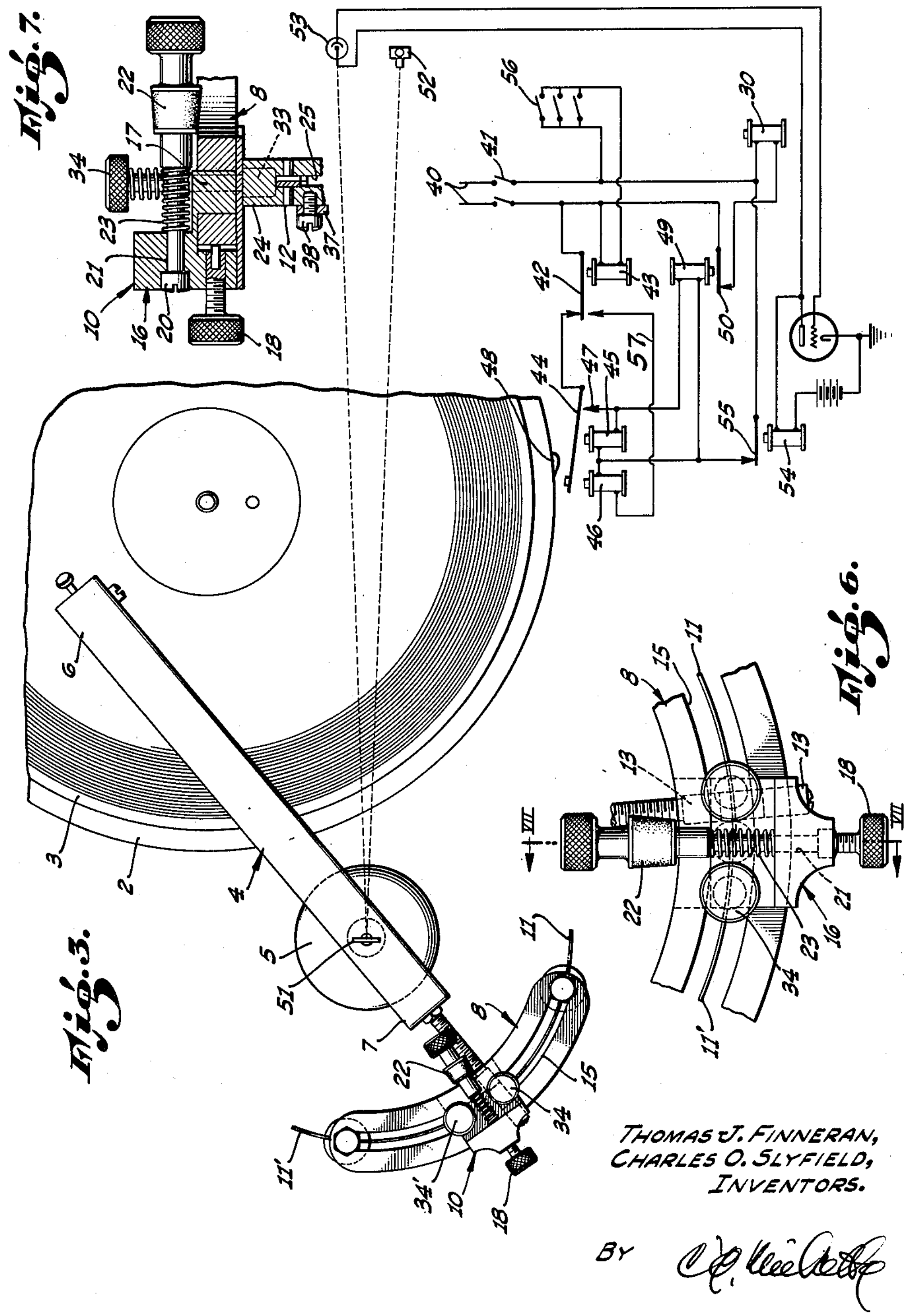
Fig. 3 is a somewhat diagrammatic top plan view of a more highly developed embodiment of the device and includes a schematic electrical control circuit which may be used therewith.
Fig. 6 is an enlarged top plan view of a portion of the apparatus.
Fig. 7 is a vertical section taken along the plane VII—VII in Fig. 6.

A simple embodiment of the invention is more or less diagrammatically illustrated in Figs. 1 and 2. As there shown, the table, case or other primary support 1 is provided with the turntable 2 carrying the record disc 3. Suitable means for driving the turntable are also provided but not illustrated, since they are customary. A tone arm, indicated at 4, is mounted upon a suitable pivotal mounting of the character stated at 5. A pickup stylus or reproducing needle is carried by the end 6 of the tone arm and may be selectively placed in engagement with any portion of the record 3.

Mounted upon the base 1 adjacent the other end 7 of the tone arm 4 is a guide 8 preferably lying in a plane parallel to the record 3. The guide 8 may be either straight or curved around the pivot mount as a center. The guide 8 may be supported at a desired level above the base 1 by suitable supporting means 9.

Slidably and adjustably mounted upon the guide 8 is a stop carriage 10. Any suitable means for adjustably positioning the stop carriage along the guide 8 may be provided. Said stop carriage carries a relatively light translating arm 11 pivotally connected to the carriage as at 12.

The end 7 of the tone arm 4 may be provided with suitable antifriction means 13 (such as a roller mounted upon a suitable stud), such antifriction means being capable of slidably contacting the arm 11.

If it is desired to repeatedly initiate reproduction from the record 3, the pickup 6 is placed at the point at which the record is to be started and the carriage 10 is moved into contact with the antifriction means 13 and locked in such position. Reproduction may then be had and whenever it is desired to return the pickup to such predetermined starting position, it is only necessary to move the translating arm 11 downwardly into the position indicated in dotted lines in Fig. 2, whereupon the tone arm 4 will be lifted out of engagement with the record 3 and automatically moved to the initial starting position, the weight of the tone arm causing the antifriction means 13 to roll or move along the inclined translating arm until such antifriction means abut the stop carriage 10. By releasing the translating arm 11, the pickup of the tone arm 4 will be deposited upon the record 3 at the predetermined and desired starting point.

It will be appreciated that by changing the position of the stop carriage 10 along the guide 8, the initial reproducing position may be varied and reproduction may be started at any desired point. Return to such initial position may be attained at any time during the playing of the record and is not dependent upon the travel of the tone arm to some extreme position or limit of the record 3.

In a more complete and detailed form of the apparatus, means may be provided for moving the stop carriage 10 with greater precision. Manual or automatic means for actuating the translating arm 11 may be provided. Automatic means for initiating reproduction not only within a given groove but in a specified portion of a groove may be provided and the device may include means for automatically repeating any desired portion of a recording.

A more complete form of apparatus embodying these additions and modifications is illustrated in Figs. 3 to 7 hereof. As shown in these drawings, the stationary guide 8 is mounted upon tubular posts 9 and 9'. The guide 8 is provided with a longitudinal slot 15 and the stop carriage 10 is provided with an upstanding lip 16 and a tongue 17 capable of extending into the slot 15 of the guide 8. The carriage 10 is slidably movable along the guide and any suitable means for locking the stop carriage in position may be provided, such as for example, a set screw 18, said set screw being capable of bearing against the guide 8. Means for gradually and accurately moving the carriage 10 along the guide 8 may also be provided. Such means are shown in the drawings to include a stud pin 20 slidable in a bore 21 and carrying a friction cone 22, the stud and its friction cone being automatically maintained out of contact with the top surface of guide 8 by means of a compression spring 23. It will be evident that by moving the friction cone toward the left (Fig. 7), contact is made between the cone and the guide 8 so that rotation of the cone will move the carriage along the guide 8.

The carriage 10 is also provided with a downward extension or stop 24, such extension being slotted as indicated at 25. Within such slot the ends of translating arms 11 and 11' are pivotally mounted as by the pin 12. These arms 11 and 11' may extend through vertical slots 26 formed in the supports 9 and may extend therebeyond. Slidably mounted within each of the tubular supports 9 is a slotted yoke 27 through which the arms 11 also extend. Each yoke 27 may be connected as by means of a rod 28 to an electrical or automatic means for actuating the yoke and depressing or inclining the arms 11. The rods 28, for example, may be connected to the core 29 of a solenoid 30, the end of the rod 29 being preferably provided with a dash-pot or damping means 31. It will be noted that each of the slotted yokes 27 is normally upwardly biased as by means of a spring 32 contained within the tubular supports 9.

Manual means for inclining each of the arms 11 may also be provided upon the carriage 10. Such means may consist of normally upwardly spring-biased plungers 33 and 33' which may be actuated by the knobs 34 and 34'. The plungers 33 are adapted to move against the upper edge of the arms 11 when the knobs 34 are depressed.

In order to prevent the tone arm and the antifriction means 13 from bouncing away from the stop carriage and stop post 24 thereof (when the antifriction means is returned to an initial position established by the carriage) the lower edge of the arm 11 may be provided with a slight relief as indicated at 36.

In some instances it is desirable to position the carriage 10 by listening to the record while it is being reproduced so that the precise point at which repetition is to start can be located. In order to accomplish this result, the stop carriage 10 is loosened upon its guides 8 by releasing the lock 18 and the antifriction means 13 of the tone arm are held in contact with the stop 24 of the carriage 10 by means of an anchor or pivoted dog 37, such dog being pivotally connected to the stop 24 as at 38. In this manner the tone arm and antifriction means 13 are caused to move the carriage 10 to a desired point, and when such point is reached the carriage is locked by actuation of the lock 18.

It may be noted that in the device illustrated, two translating arms 11 and 11' are shown, thereby permitting the device to be employed with recordings cut from the center to the exterior edge of a disc or vice versa, it being understood that the antifriction means can be caused to cooperate with either arm 11 or 11', depending upon the manner in which the disc has been originally recorded.

Automatic means may be provided for returning the tone arm to an initial starting position with great accuracy. Such means may include an electrical arrangement of the character indicated in Fig. 3 wherein the electrical circuit is diagrammatically shown in its relationship to the turntable 2. Generally stated, electrical energy is supplied by leads 40 controlled by switch 41. The arm 42 of a relay or solenoid operated switch 43 is normally closed and supplies current to arm 44 of a switch in operative relation to coils or relays 45 and 46. The switch arm 44 is capable of being moved into position to make contact at 47 by means of a lug 48 carried by the turntable 2. When such contact is made (and the device is in position to initiate reproduction) current is supplied to coil 45 and to relay or solenoid 49 which opens its correlated contact 50 and breaks the circuit to the solenoid coil 30 which has previously been energized and has held the arms 11 and 11' in a downward, inclined position.

The tone arm 4 may carry an adjustable reflecting mirror 51 receiving light from a source 52. A movably positionable photoelectric cell 53 is so positioned as to receive light reflected from mirror 51 at the end when a predetermined point in the record 3 has been reached. The photoelectric cell 53 is in circuit with its relay 54 so that when such predetermined point is reached switch 55 is opened, thus breaking the circuit and de-energizing the relay 49 which allows the switch 50 to close, thus closing the circuit to the solenoid 30 for actuating the translating arm 11 downwardly, thus permitting the tone arm to start its return to the initial starting point. The opening of the switch 55 by the energization of the photoelectric relay coil 54 also de-energizes relay 45, thus allowing arm 44 to break contact at 47 and to return the switch arm 44 to a position where it may be tripped by lug 48 on the turntable.

In the event it is desired to return the tone arm to initial starting position before it reaches a point at which the photoelectric cell is energized, such return may be initiated by the closure of any one or more switches 56 which close the circuit to coil 43 causing the arm 42 to close a circuit with contact line 57. This causes energization of coil 46 and simultaneously deenergizes solenoid 49, permitting switch 50 to close and thereby energizing the pull-down solenoid coil 30.

Numerous modifications of this invention will occur to those skilled in the art and are included herein. For example, the guide and translating arms need not necessarily be curved, providing the extension member or tailpiece and the roller or other antifriction means are long enough and so positioned as to engage the translating arm. The tone arm or movable member need not necessarily be pivotally mounted, but may move rectilinearly, in which case the guide, carriage, and translating arms may be modified so as to suitably engage the tone arm or movable member for rectilinear movement thereof. There need not necessarily be two translating arms. Said translating arms need not be necessarily pivotally mounted but may be mounted in any suitable manner wherein movement of a portion thereof will cause repositioning or resetting translatory movement of the roller, tone arm, or other movable member. Furthermore, the tone arm or other movable, positionable member may or may not be provided with rotatable means such as the roller for engaging the translating arms. The roller or any other suitable engaging means need not necessarily engage the under surface of the translating arms but may be, for example, mounted in a slot therein or may engage the translating arms in any other suitable manner. Furthermore, the electrical control circuit portion of the invention may be dispensed with entirely and the apparatus may be entirely manually operated.

The invention may be modified so as to automatically or manually reposition the needle mounting of a transducer provided with a rotating drum for mounting a recorded medium thereon. The various relays, solenoids, and the like, may be replaced by other electrically operable means. The manual translator arm actuators may be modified in any suitable manner. The apparatus may be powered other than electrically, if so desired. The photosensitive control means may be replaced by numerous other systems responsive to position of a primary movable member. The locking means, the adjusting means, and various other mechanical features of the invention may be modified in any suitable manner.

The examples described and illustrated herein are for illustrative purposes only and are not intended in a limiting sense. This invention is to be limited only by the scope of the appended claims.

We claim:

1. In a phonograph including a rotatable turntable and a tone arm in operative relation thereto, said tone arm being mounted for pivotal movement on vertical and horizontal axes, one end of the tone arm being provided with a pickup, the provision of means for automatically returning the tone arm to a selected starting position, comprising: a fixedly mounted curved guide adjacent the turntable; a selectively positionable carriage slidably mounted on the guide, said carriage being provided with a downwardly extending stop; a rigid, curved, translating arm having one free end and one end pivotally connected to the stop; an extension member carried by the end of the tone arm opposed to the pickup, said extension member being provided with a roller adapted to roll along the lower surface of the translating arm toward the stop and to be stopped thereby at a selected position of the carriage when the free end of the translating arm is in a lowered position; and means to controllably lower the free end of the translating arm.

2. In a phonograph including a rotatable turntable and a tone arm in operative relation thereto, said tone arm being mounted for pivotal movement on vertical and horizontal axes, one end of the tone arm being provided with a pickup, the provision of means for automatically returning the tone arm to a selected starting position, comprising: a fixedly mounted curved guide adjacent the turntable; a selectively positionable carriage slidably mounted on the guide, said carriage being provided with a downwardly extending stop; a rigid, curved, translating arm having one free end and one end pivotally connected to the stop; and extension member carried by the end of the tone arm opposed to the pickup, said extension member being provided with a roller adapted to roll along the lower surface of the translating arm toward the stop and to be stopped thereby at a selected position of the carriage when the free end of the translating arm is in a lowered position; and electrically operable means including a solenoid for controllably lowering the free end of the translating arm to return the tone arm to selected starting position established by the carriage and stop, said electrically operable means including a switch controlled by the turntable for deenergizing the solenoid to release the translating arm and initiate reproduction.

3. In a phonograph including a rotatable turntable and a tone arm in operative relation thereto, said tone arm being mounted for pivotal movement on vertical and horizontal axes, one end of the tone arm being provided with a pickup, the provision of means for automatically returning the tone arm to a selected starting position, comprising: a fixedly mounted curved guide adjacent the turntable; a selectively positionable carriage slidably mounted on the guide, said carriage being provided with a downwardly extending stop; a rigid, curved, translating arm having one free end and one end pivotally connected to the stop; an extension member carried by the end of the tone arm opposed to the pickup, said extension member being provided with a roller adapted to roll along the lower surface of the translating arm toward the stop and to be stopped thereby at a selected position of the carriage when the free end of the translating arm is in a lowered position; and electrically operable means including a solenoid for controllably lowering the free end of the translating arm to return the tone arm to selected starting position established by the carriage and stop, and means actuated by movement of the tone arm to a predetermined position away from the selected starting position for energizing the solenoid.

4. An apparatus of the character stated in claim 3, wherein said electrically operable means includes a switch controlled by the turntable for deenergizing the solenoid to release the translating arm and initiate reproduction.

THOMAS J. FINNERAN.
CHARLES O. SLYFIELD.

REFERENCES CITED

The following references are of record in the file of this patent:

UNITED STATES PATENTS

| Number | Name | Date |
|---|---|---|
| 1,202,312 | Prout | Oct. 24, 1916 |
| 1,470,812 | Cotton | Oct. 16, 1923 |
| 2,066,859 | Schiler | Jan. 5, 1937 |
| 2,099,868 | Sing et al. | Nov. 23, 1937 |
| 2,141,804 | Thompson et al. | Dec. 27, 1938 |
| 2,192,360 | Mann | Mar. 5, 1940 |
| 2,231,938 | Miessner | Feb. 18, 1941 |
| 2,352,778 | Eddy | July 4, 1944 |

FOREIGN PATENTS

| Number | Country | Date |
|---|---|---|
| 547,842 | Germany | Mar. 29, 1932 |